US012151343B2

(12) United States Patent
Ball

(10) Patent No.: US 12,151,343 B2
(45) Date of Patent: Nov. 26, 2024

(54) TORQUE APPLICATION TOOL

(71) Applicant: NORBAR TORQUE TOOLS LTD, Banbury (GB)

(72) Inventor: Andy Ball, Banbury (GB)

(73) Assignee: Norbar Torque Tools Ltd, Banbury (GB)

( * ) Notice: Subject to any disclaimer, the term of this patent is extended or adjusted under 35 U.S.C. 154(b) by 498 days.

(21) Appl. No.: 17/599,891

(22) PCT Filed: Apr. 3, 2020

(86) PCT No.: PCT/GB2020/050894
§ 371 (c)(1),
(2) Date: Sep. 29, 2021

(87) PCT Pub. No.: WO2020/201770
PCT Pub. Date: Oct. 8, 2020

(65) Prior Publication Data

US 2022/0168875 A1 Jun. 2, 2022

(30) Foreign Application Priority Data

Apr. 4, 2019 (GB) ..................................... 1904786

(51) Int. Cl.
*B25B 23/147* (2006.01)
*B25B 23/00* (2006.01)
*B25F 5/00* (2006.01)

(52) U.S. Cl.
CPC ........ *B25B 23/147* (2013.01); *B25B 23/0078* (2013.01); *B25F 5/001* (2013.01)

(58) Field of Classification Search
CPC ..... B25B 21/00; B25B 21/002; B25B 21/008; B25B 23/00; B25B 23/14; B25B 23/142;
(Continued)

(56) References Cited

U.S. PATENT DOCUMENTS 4,864,903 A * 9/1989 Bickford ................ G05D 17/02 81/467
4,923,047 A 5/1990 Fink et al.
(Continued)

FOREIGN PATENT DOCUMENTS

DE 102008054508 A1 6/2010
EP 0320723 A2 6/1989
(Continued)

OTHER PUBLICATIONS

International Search Report (Form PCT/ISA/210) for International Application No. PCT/GB2020/050894, mailed Jul. 22, 2020, 3 pages.

(Continued)

*Primary Examiner* — Robert J Scruggs
(74) *Attorney, Agent, or Firm* — Withrow + Terranova PLLC; Vincent K. Gustafson

(57) ABSTRACT

A torque tool for applying torque to a workpiece is disclosed. A drive shaft is connected to a first component with a rotatable output such that rotation of the drive shaft rotates the rotatable output and a second component is fixedly arranged relative to the first component. A beam transducer extends lengthwise axially and is coupled to the two components. The first component is arranged such that a reaction force experienced by the rotatable output tends to turn the first component relative to the second component. The transducer beam resists which causes it to bend. A bending measurement means or sub-system is then used to measure the degree to which the beam transducer bends.

18 Claims, 7 Drawing Sheets

(58) Field of Classification Search
CPC . B25B 23/147; B25B 23/159; B25B 23/0078; B25F 5/001; B25F 5/02; G01L 3/1457
See application file for complete search history.

(56) References Cited

U.S. PATENT DOCUMENTS

| | | | | |
|---|---|---|---|---|
| 9,016,398 | B2 * | 4/2015 | Steckel | B25B 23/1425 173/181 |
| 2010/0147545 | A1 * | 6/2010 | Hirt | B25B 23/14 74/606 R |

FOREIGN PATENT DOCUMENTS

| | | | | |
|---|---|---|---|---|
| EP | 0601988 | A1 | | 6/1994 |
| EP | 2607028 | A2 | | 6/2013 |
| GB | 1474617 | A | | 5/1977 |
| JP | H06254775 | | * | 9/1994 |
| JP | H06254775 | A | | 9/1994 |
| WO | 2005082577 | A1 | | 9/2005 |
| WO | 2008033386 | A2 | | 3/2008 |

OTHER PUBLICATIONS

Written Opinion (Form PCT/ISA/237) for International Application No. PCT/GB2020/050894, mailed Jul. 22, 2020, 5 pages.
Search Report under Section 17(5) for United Kingdom Patent Application No. GB200536.5 mailed Sep. 16, 2020, 4 pages.

* cited by examiner

TORQUE APPLICATION TOOL

CROSS-REFERENCE TO RELATED APPLICATION(S)

This application is a 35 U.S.C. § 371 national phase filing of International Application No. PCT/GB2020/050894 filed on Apr. 3, 2020 and claiming benefit of United Kingdom Patent Application No. 1904786.9 filed on Apr. 4, 2019, wherein the disclosures of the foregoing applications are hereby incorporated by reference herein in their respective entireties.

The present invention is directed towards torque tools, in particular to torque tools comprising an arrangement for measuring the torque applied by the tool.

A multitude of different components in a wide variety of different applications require tightening to a specific torque. In fact, in many applications, standards stipulate the torque to which a component, e.g. a nut provided on a threaded bolt, must be tightened. Accordingly, when tightening a component, it is often essential to be able to determine the torque to which the component is tightened. As an example, many fixings on motor vehicles have to be tightened to a specific torque for safety purposes.

Torque tools often comprise a torque transducer in order to provide a measurement of the torque to which a component is tightened. For example, U.S. Pat. No. 9,016,398 discloses a torque tool comprising an in-line transducer which comprises a reference disk connected to a rim via a web, as seen in FIG. 5 of U.S. Pat. No. 9,016,398. The transducer is arranged in-line with the electric motor and drive train. The reference disk, of the transducer, is held in a fixed position and when the tool is used to tighten a component to a specific torque, the rim is caused to rotate around the reference disk, thereby deforming the web. Strain gauges placed on the web measure the amount of deformation. In this particular arrangement, it is necessary for the web to be relatively thin in order to deform when experiencing a rotational force from the rim. Such a transducer having a thin web arranged between the reference disk and web can be complicated, and costly, to manufacture. Additionally, as the web is necessarily very thin, such prior art transducers are often inherently prone to damage, e.g. due to sudden impacts such as dropping of the tool, which may occur frequently in an industrial setting.

Accordingly, the present invention broadly comprises a torque tool, for applying torque to a workpiece, comprising:

- a drive shaft;
- a first component having a rotatable output, and operatively connected to the drive shaft such that rotation of the drive shaft rotates the rotatable output;
- a second component fixedly arranged relative to the first component;
- a beam transducer extending lengthwise axially between the first and second components, and coupled to the first and second components; and
- a bending measurement means or sub-system arranged to measure bending of the transducer beam;
- wherein the first component is arranged such that a reaction force experienced by the rotatable output, in use, tends to turn the first component relative to the second component, the turning of which is resisted by the transducer beam thus causing bending of the transducer beam, and wherein the bending measurement means or sub-system is arranged to measure the bending of the transducer beam.

Thus it will be seen that the arrangement of components in torque tools in accordance with the present invention use turning of the first component relative to the second component in order to drive bending of the beam transducer. The beam transducer coupled in this arrangement may be considered to be a cantilever beam transducer. As will be appreciated by those skilled in the art, measurement of the amount of bending of the beam transducer can be used to provide an indication of the amount of torque applied to the workpiece. The Applicant has found that the use of a beam transducer, as opposed to the prior art in-line transducers discussed above, is advantageous as beam transducers are typically more robust. Many torque tools undergo rigorous testing, prior to release, in order to ensure they meet the relevant industry standards. One of the typical tests that torque tools undergo is drop testing. The use of a beam transducer, as opposed to the prior art in-line transducers described above, has been found to perform particularly well in drop tests as well as generally being robust. As will be appreciated by those skilled in the art, a robust torque tool, capable of withstanding significant impacts is extremely important, particularly when the tool is used in industrial environments. The Applicant has also found that the use of a beam transducer, instead of the prior art transducer of the type described above, can be cheaper and easier to manufacture as it does not, necessarily, require complicated manufacturing techniques. This may result in a torque tool which has a lower manufacturing cost. Additionally, the use of a beam transducer may simplify the assembly of the torque tool and also make the tool easier to service as the beam transducer may, for example, more easily be replaced without necessarily needing to remove or replace other components.

The Applicant has further found the claimed arrangement of the beam transducer to be particularly advantageous, especially when compared to existing tools, as the arrangement of the transducer does not significantly affect the overall length of the tool. The beam transducer may extend axially along an outer surface of one or both of the first and second components, and be coupled with, for example, a protrusion extending therefrom. Accordingly, the first and second components may be arranged immediately next to one another. There is no requirement to provide a spacing between the components, for example to incorporate an in-line transducer. This may, therefore, reduce the overall length of the torque tool.

As will be understood by those skilled in the art, when the torque tool is used to apply torque to a workpiece and the rotatable output experiences a reaction force, this will drive turning of the first component relative to the second, fixed, component. As the beam transducer is coupled to the first and second components, when the first component turns due to the reaction force, one end of the beam transducer will effectively remain stationary about the rotational axis due to being coupled to the second component, and the other end will be made to turn around the rotational axis, due to the coupling of the beam transducer with the first component. The location and type of coupling of the beam transducer on each of the first and second components may impact how the beam transducer responds to the torque applied by turning of the first component. Preferably the beam transducer is arranged and coupled such that the first component laterally bends the beam transducer.

In a set of embodiments, the torque tool is configured for operation in a torque application range of about 5-20,000 Nm, preferably 10-15,000 Nm. The torque output of the tool may at least partially be determined by a secondary gearbox coupled to the rotatable output of the first component. As will be appreciated, the amount of bending of the beam transducer as the rotatable output experiences a reaction force will depend on the size and material of the beam transducer, along with the size of the reaction force.

In a set of embodiments, the bending measurement means or sub-system comprises at least one strain gauge. The Applicant has found that a single strain gauge is sufficient for measuring the bending of the beam transducer and thus determining the amount of torque applied to a workpiece. Of course, the bending measurement means or sub-system may comprise a plurality of strain gauges, for example arranged at different positions along a length of the beam transducer in order to measure the strain, i.e. the amount of bending, at different positions along the beam transducer. A plurality of strain gauges may allow a more sophisticated measurement of the amount of torque applied to a workpiece. Strain gauges are particularly suitable as they are capable of measuring small strains, i.e. bending, of the beam transducer.

The Applicant has recognized that the use of a strain gauge is not the only possible means for measuring the bending of the beam transducer and any other suitable means or sub-system may be used. For example, the bending measurement means or sub-system may comprise an optical measuring means or sub-system arranged to measure the amount of bending of the beam transducer optically. Other alternatives may include the use of a displacement sensor or a pressure-based sensor.

As will be appreciated by those skilled in the art, the beam transducer must be coupled to each of the first and second components in a manner such that as the first component turns relative to the second component, the beam transducer is caused to bend. In a set of embodiments, a first end of the beam transducer is fixedly coupled to one of the first or second components. In a further set of embodiments, the beam transducer is fixedly coupled to the second component. Fixedly coupling the beam transducer to the second component may provide a stable, fixed point of reference about which to bend the beam transducer. The fixed coupling of the beam transducer to one of the first and second components may be achieved by any suitable means. For example, the beam transducer may be secured using a screw, or other suitable fixing means, or welded to the respective component. In another set of embodiments, the fixed coupling is achieved by the beam transducer being formed as an integral part of one of the first and second components, e.g. as a single cast part. This may, advantageously, achieve a beam transducer which is coupled to one of the first or second components which does not rely on other fixing means, e.g. screws, which may introduce a point of weakness.

A second end of the beam transducer may be fixedly coupled to the other of the first or second components. In a set of embodiments, however, a second end of the beam transducer is received in a beam receiving portion provided on one of the first or second components, so as to be moveably coupled to one of the first or second components. The second end of the beam transducer is thus coupled such that it can move within the beam receiving portion as the first component turns and applies a force tending to bend the beam transducer. By coupling the second end of the beam transducer to the beam receiving portion, the reaction force is still transferred to the beam transducer in order to bend the beam transducer, whilst at the same time allowing, at least to a small extent, the second end of the beam transducer to move within the beam receiving portion. This may be considered equivalent to providing the second end with a degree of freedom of movement within the beam receiving portion. Whilst ideally the first component may be mounted in the torque tool in a manner such that it is only able to turn relative to the beam transducer, in reality it is likely that it will also have at least a small amount of freedom to move laterally, at least with respect to the beam transducer. Depending on the particular configuration of the coupling, the Applicant has found that allowing the second end to move within the beam receiving portion may help to ensure that the first component consistently applies a force at the same position on the beam transducer. This effectively means that the length of the beam transducer which is bent remains constant, even if the first component moves slightly. Keeping the length of the beam transducer constant in this manner may advantageously help to provide accurate torque measurements, as the Applicant has recognized that changing the position at which the force is applied may alter the amount of bending of the beam transducer for a given force and thus alter the output of the bending measurement means or sub-system. In a further set of embodiments, the beam receiving portion is provided on the first component.

The beam receiving portion may take any suitable form that is capable of receiving the second end of the beam transducer. In a set of embodiments, the beam receiving portion comprises an aperture or slot in one of the first or second components, dimensioned to receive the second end of the beam transducer. In a further set of embodiments, the aperture or slot is located in a peripheral region of the first or second components. Arranging the aperture or slot in a peripheral region may be considered equivalent to arranging the aperture or slot at a radial spacing from an axis about which the first component is arranged to turn. For example, in embodiments wherein the first component is provided by a gearbox, as will be discussed in more detail below, the aperture or slot may be arranged in, or extend from, an outer casing of the gearbox. The Applicant has recognized that providing a slot in a peripheral region of the first or second components may make assembly of the various components easier. Additionally, arranging the beam receiving portion in a peripheral region of the first and or second components, and thus having the beam transducer extending lengthwise axially at this periphery, may increase the force applied to the beam transducer and hence increase the bending of the beam transducer. An increase in the amount of bending for a given angular rotation of the first component may increase the accuracy to which the tool can determine the applied torque. The first or second components may have a cylindrical profile.

In embodiments wherein the second end of the beam transducer is received in the beam receiving portion, the second end of the beam transducer may be at least partially rounded. In a further set of embodiments, a portion of the second end of the beam transducer is substantially spherical. The Applicant has recognized that having a rounded end on the beam transducer means that even as the beam transducer moves within the beam receiving portion, the point on the beam transducer at which the bending force is applied remains constant. Again, as described above, this may help to ensure that the length of the beam transducer which is bent remains constant which may help to provide accurate torque measurement. Additionally, the rounded end may also prevent the beam receiving portion from being able to, or at least minimize its ability to, twist the beam transducer and instead the beam receiving portion may slide against the rounded end, whilst still continuing to apply a lateral bending force. The rounded second end may therefore more easily move within the beam receiving portion.

The beam transducer extends lengthwise axially between the first and second components in a manner such that the beam transducer is caused to bend when the second component turns relative to the first component. In a set of embodiments, the rotatable output defines a rotational axis, and the beam transducer extends lengthwise axially parallel to, and spaced from, the rotational axis. The Applicant has found that this particular arrangement maximizes the amount of bending of the beam transducer and thus it may be possible to obtain a more accurate measurement of the amount of torque applied to a workpiece. Of course it is not essential that the beam transducer extend parallel to the rotation axis, as long as the beam transducer is caused to bend when the first component is turned.

The second component may be any component within the tool which is held in a fixed position. As the beam transducer is coupled to the second component which is in a fixed position, the second component may effectively be considered as providing a fixed reference point about which to bend the beam transducer. In a set of embodiments, the tool comprises a housing and the second component is fixedly mounted to the housing. For example, the second component may be attached to the housing by at least one fixing element such that the second component cannot rotate. In this embodiment, the housing effectively defines a frame of reference about which the respective parts of the torque tool may rotate. Alternatively, the second component may be the housing or be an integral part of the housing, e.g. integrally moulded.

The first component may be any component capable of taking the drive shaft as an input in order to drive rotation of the rotatable output. In a set of embodiments, the first component comprises a gearbox. The gearbox may be of any type, for example a planetary gearbox. In a set of embodiments, the gearbox is a two-stage gearbox. In embodiments where the beam transducer is movably coupled to the first component, i.e. the gearbox, the gearbox may be manufactured to incorporate means for coupling the beam transducer, e.g. a beam receiving portion in the form of an aperture or slot arranged on a peripheral outer portion thereof. The outer portion may be the external casing of the gearbox. Such a gearbox may be arranged to turn about a central axis extending therethrough. Accordingly, in such a set of embodiments the beam receiving portion may be radially displaced from the axis about which the gearbox will turn.

Ideally, the gearbox is arranged within the tool such that it is only capable of turning and is not capable of moving in any other way. However, in reality this is difficult to achieve and the gearbox will typically tilt somewhat away from its rotational axis in during use. The Applicant has recognized that this tilting may cause the point of contact between the beam receiving portion and the beam transducer to change which may alter the amount of bending of the beam transducer. This may therefore potentially output a less accurate torque reading. In embodiments wherein the first component is a gearbox and wherein the beam receiving portion is provided on the gearbox, the gearbox may comprise a series of internal bearings which are arranged in the gearbox in alignment with the beam receiving portion. In a further set of embodiments in which the second end is at least partially rounded, preferably the at least partially rounded second end is aligned with the internal bearings. The Applicant has found that this specific set up may help to minimize the amount that the gearbox can tilt within the tool during use which may help to ensure that the beam receiving portion consistently applies a bending force to substantially the same part of the second end of the beam transducer. This may help to ensure that the arrangement consistently outputs an accurate torque measurement. The drive shaft of the torque tool may be driven by any suitable arrangement. In a set of embodiments, the torque tool further comprises a motor arranged to rotate the drive shaft. The motor may be driven with any means, such as, for example, electric, fuel, air or hydraulic. In another set of embodiments, the tool further comprises a manual arrangement for rotating the drive shaft. For example, the tool may comprise a lever member operatively connected to the drive shaft in order to drive rotation thereof.

The Applicant has recognised that it may be possible to accurately determine the amount of torque applied to a workpiece using a single beam transducer. However, the tool may comprise multiple beam transducers extending lengthwise axially between the first and second components. Each of the beam transducers may be implemented according to any of the embodiments described above. The provision of additional beam transducers may increase accuracy in the measurement of the amount of torque applied by the tool.

The torque tool may comprise a controller as part of, or connected to, the beam measurement means or sub-system, capable of determining from the output of the beam measurement means or sub-system, a measured amount of torque applied by the tool. The torque tool may further comprise a display arrangement for outputting an indication of the measured amount of torque applied by the tool. The display arrangement may, for example, comprise an electronic display such as an organic light-emitting diode (OLED) display, a thin-film transistor liquid-crystal display (TFT LCD) and/or a touchscreen display. In another set of embodiments, the torque tool comprises a user input means, e.g. a button or touchscreen, configured to allow a user to input a target torque. Such a user input means may be coupled with a controller. In a further set of embodiments, the torque tool is arranged to output a warning when the target amount of torque applied by the tool is approached or reached. In another set of potentially overlapping embodiments, the torque tool is configured to stop rotation of the drive shaft when the target amount of torque applied by the tool is reached. This may, for example, be achieved by cutting off the power supply to a motor, where provided. This, advantageously, enables the required prevention of overtightening a workpiece which may cause damage to the workpiece itself or the object it is attached to.

The Applicant has also found that the temperature of the tool can impact the torque readings from the beam transducer and bending measurement means or sub-system. In a further set of embodiments, the torque tool comprises at least one temperature sensor, arranged to provide a temperature measurement within the tool, operatively connected to the controller and wherein the controller is configured to account for the temperature measurement when determining a measured amount of torque applied by the tool. This arrangement may allow the controller to more accurately determine the measured amount of torque applied by the tool by accounting for the temperature of the tool. The torque tool may comprise a plurality of temperature sensors arranged at different positions in the tool. In a set of embodiments, the temperature sensor is arranged on the beam transducer in order to provide a temperate measurement of the beam transducer itself. The Applicant has found that this may allow the controller to account for the temperature with increased accuracy.

In a set of embodiments, the torque tool further comprises a transceiver configured for wireless communication with a separate device. For example, the torque tool may communicate the measured torque to a central computer for further analysis, or to an infrastructure data collection system, such as Manufacturing Execution Systems.

The rotatable output of the first component may, for example, be engaged with a workpiece via a suitable connector, e.g. a socket. Additionally, or alternatively, the rotatable output of the first component may be engaged with a secondary gearbox. The secondary gearbox may be used to alter, for example increase, the torque output of the torque tool. It may, therefore, be possible to alter the torque output of the tool by only changing the secondary gearbox. The torque tool may comprise an arrangement for recognizing the type of secondary gearbox which is engaged with the first component. For example, the torque tool may determine that the particular secondary gearbox engaged is suitable for a specific torque range. The tool may then monitor the torque application through the beam transducer in an appropriate manner. The Applicant has recognized that providing multiple different secondary gearboxes which may be selectively attached to the torque tool may increase the number of applications in which the torque tool can be used. Therefore, according to a second aspect, the present invention provides a kit comprising a torque tool in accordance with any of the embodiments described above, along with at least two different secondary gearboxes suitable for engaging with the torque tool.

The beam transducer may be shaped, dimensioned, and/or made from a suitable material such that when experiencing application of torque, it only bends by a relatively small amount, and thus only allows a small amount of turning of the first component. The amount that the beam transducer is designed to bend, and therefore the angle that the first component is permitted to rotate, may vary for each torque tool depending on its particular application. In a set of embodiments, the beam transducer is configured such that at maximum operational torque applications the first component is only capable of a maximum rotation of up to 2°, preferably up to 1°, preferably up to about 0.33°. Depending on the particular length of the beam transducer, this may for example correspond to a deflection of the beam transducer of between 0.17-0.22 mm. The Applicant has recognized that ensuring that bending of the beam transducer is not too great helps to prevent the beam transducer from suffering from stresses and thus ensures the longevity of the beam transducer and its ability to accurately measure the torque.

The specific shape and dimensions of the beam transducer may determine its ability to bend which may have an impact on the amounts of torque that can be measured. In a set of embodiments, the beam transducer comprises a narrowed portion on which the bending measurement means is arranged. The narrowed portion may, for example, be between 30-90% of the thickness, e.g. diameter, of the rest beam transducer. The Applicant has recognized that the narrowed portion may be used to control the sensitivity of the beam transducer. For example, if the torque tool is only going to be used in low torque applications, the narrowed portion may be thinner than a beam transducer used in a tool which is used in high torque applications, such that it is able to deform at lower torque applications. Therefore, by tuning the depth of the narrowed portion, it may be possible to adjust the sensitivity of the beam transducer. The beam transducer may, for example, be in the form of a cylindrical beam and the narrowed portion may be provided by a flattened portion along at least part of the length of the cylindrical beam. The bending measurement means may be arranged on this flattened portion.

In a set of embodiments, the beam transducer, and optionally the bending measurement means or sub-system, is arranged on a portion of the torque tool which is spaced from any surface thereof which may contact a planar surface if the tool is dropped. In a further set of embodiments, the torque tool comprises a housing comprising an upper portion connected to a handle portion, wherein a drive shaft, first component, second component, beam transducer and bending measurement means or sub-system are arranged in the upper portion and further wherein the beam transducer is arranged in a lower part of the upper portion proximal to the handle portion. This particular arrangement may further improve the robustness of the tool. In an instance whereby the tool is dropped, either the top half of the upper portion will impact the surface on which it is dropped or the handle portion, or a part attached thereto, e.g. a battery compartment, will impact the surface. Therefore, the lower part of the upper portion is substantially prevented from impacting the surface. This may therefore minimize damage to the beam transducer. Optionally, the bending measurement means may also be arranged in the lower half of the upper portion proximal to the handle portion. In embodiments wherein the first component is provided by a gearbox, the beam transducer and associated bending measurement means or sub-system may be arranged on an underside of the gearbox which is arranged proximal to the handle portion.

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated:

Figure 1:
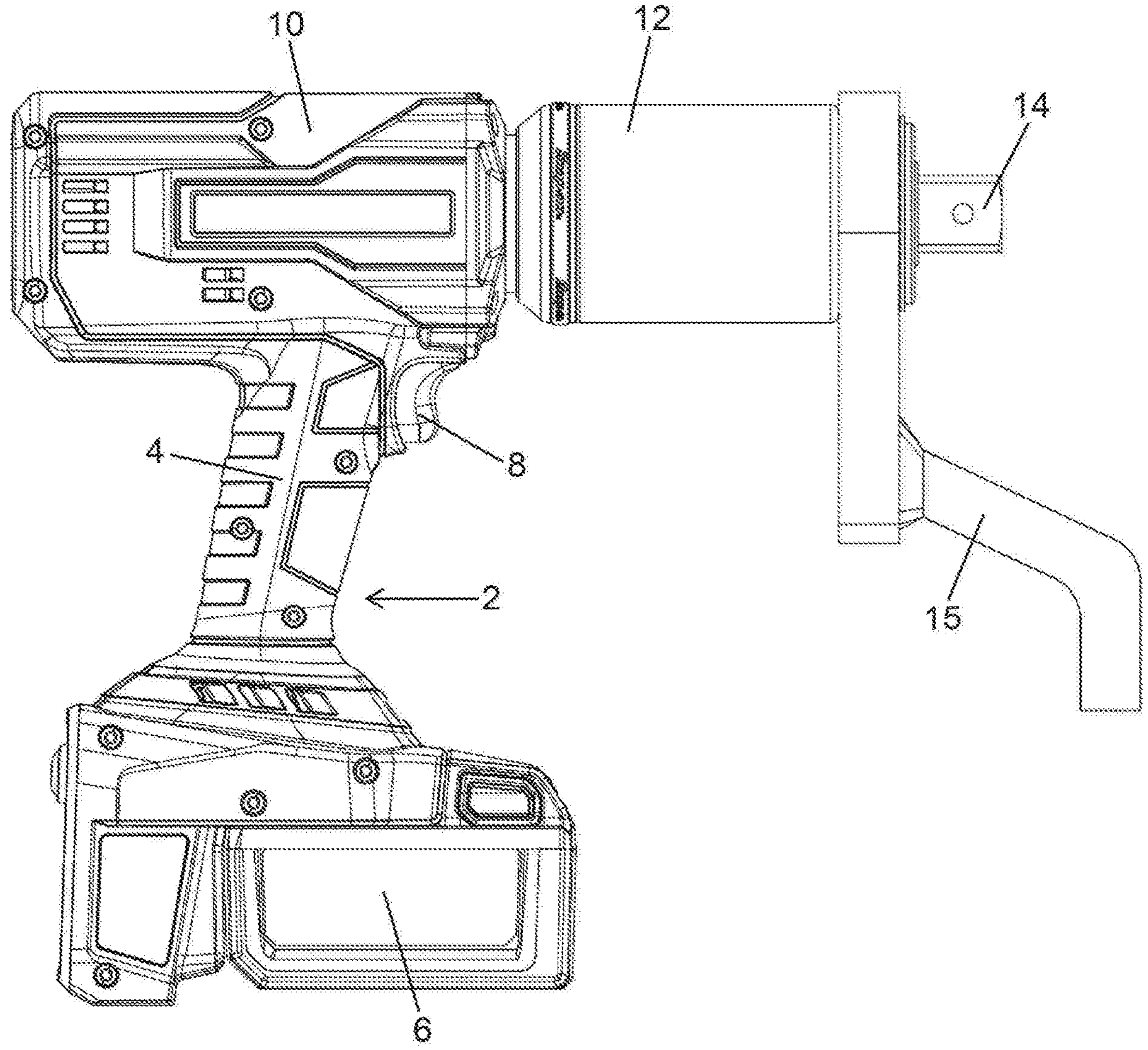
FIG. 1 shows a torque tool in accordance with an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only. FIG. 1 shows a side-view of a torque tool in accordance with an embodiment of the present invention. The torque tool shown is a hand-held torque tool comprising a housing 2 which defines a handle 4. Arranged at the base of the handle 4 is a removable Lithium-Ion battery 6 arranged to provide power for the tool. The handle 4 comprises a trigger 8 which a user may depress in order to operate the tool. The housing 2 comprises an upper portion 10 which houses an electric motor and related components, which can be seen in more detail in later Figures. The tool comprises an output gearbox 12 arranged at its front end, from which a drive output 14 extends. The torque tool further comprises a reaction arm 15, known per se in the art, arranged at a distal end of the output gearbox 12.

Figure 2:
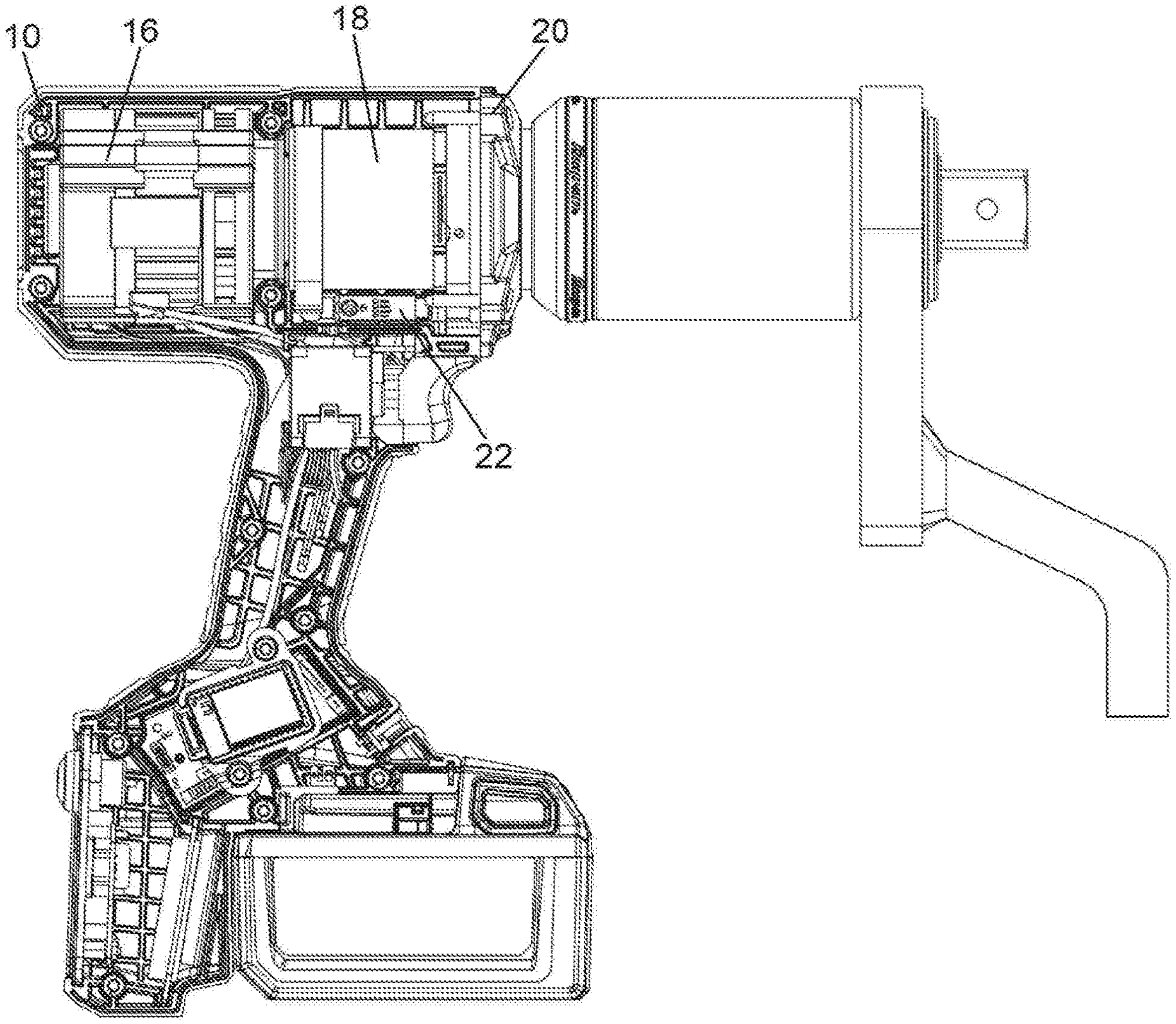
FIG. 2 shows a side view of the torque tool seen in FIG. 1 with part of the handle assembly removed to reveal the inner components.

FIG. 2 shows a side-view of the tool seen in FIG. 1, with half of the housing 2 removed to reveal the inner components. As now visible in this Figure, the tool comprises a set of components in the upper portion 10 of the housing 2. In an embodiment, a brushless electric motor 16 may be used, an output of which (not visible in this Figure) engages with and drives a first component in the form of a gear assembly 18. The gear assembly 18, in an embodiment, is in the form of a planetary gearbox. A rotatable output (not visible in this Figure) of the gear assembly 18 extends through a second component in the form of a front plate 20. The front plate 20 is fixedly mounted to the housing 2 by multiple screws, which will be described in more detail in later Figures. The upper portion 10 further houses a beam transducer 22 which extends axially between the front plate 20 and gear assembly 18. The beam transducer is fixedly coupled to the front plate 20 and extends therefrom to be coupled with the gear assembly 18, as described in more detail below.

Figure 3:
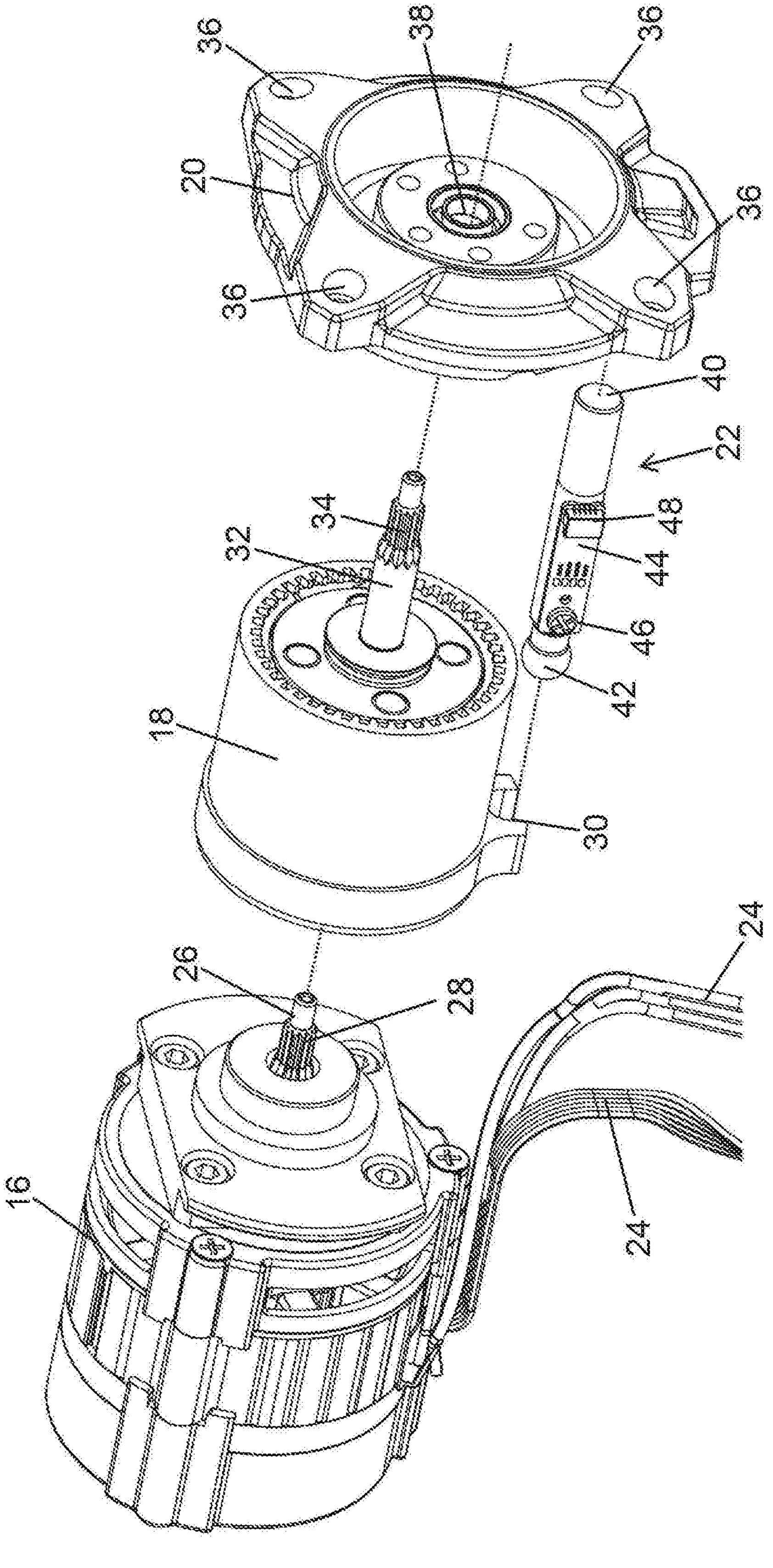
FIG. 3 shows an exploded view of the motor, gear assembly, front plate, and beam transducer.

FIG. 3 shows an exploded view of the motor 16, gear assembly 18, front plate 20 and beam transducer 22 seen in FIG. 2. In this embodiment, a series of electrical wires 24 extend from the motor 16 and are connected, within the housing 10, to the battery and associated control circuitry. The motor 16 may comprise an output in the form of a drive shaft 26 which is arranged to drive the gear assembly 18. The motor drive shaft 26 comprises a series of splines 28 extending around its circumference which are arranged to engage with a corresponding set of splines (not shown) on the gear assembly 18.

In an embodiment, the gear assembly 18 has a generally cylindrical shape and comprises, at one end on its outer casing, a beam receiving portion 30 in the form of a fork shaped protrusion extending from an outer circumference of the gear assembly 18. This beam receiving portion 30 is arranged at a fixed radial distance from the axis about which the gear assembly 18 turns when experiencing a reaction torque. The coupling between the beam transducer 22 and the beam receiving portion 30 will be described in more detail later with reference to later Figures. The gear assembly 18 further comprises a rotatable output driveshaft 32 which also comprises a series of splines 34 which are arranged to engage with, and drive, the output gearbox 12 seen in FIG. 1. As will be appreciated, rotation of the drive shaft 26 of the motor will cause rotation of the output driveshaft 32 of the gear assembly 18. The gear assembly 18 may have any appropriate gear ratio such that, for example, the rotation of the drive shaft 26 is stepped down.

The front plate 20 comprises four holes 36 extending therethrough which allow the front plate 20 to be secured to the housing 2 with suitable fixings, e.g. screws. Once secured to the housing 4, the front plate 20 can be held in a fixed position. In this particular embodiment, the front plate 20 is a discrete component which is mounted to the housing 2, however, as will be appreciated, the front plate 20 may be integrally provided with the housing 2. The front plate 20 further comprises an aperture 38, located centrally, for allowing the output driveshaft 32 of the gear assembly 18 to pass therethrough and engage the output gearbox 12. Whilst not shown, the motor 16 also comprises suitable means to secure it in a fixed position within the housing. These means may comprise, for example, at least one aperture for use with a suitable fixing element, or alternatively, the motor 16 may be shaped so as to be engaged by the housing 2 of the tool such that it is held in a fixed position. The gear assembly 18 is not fixed within the housing and is arranged in such a manner that it is able to turn about its axis.

A dashed line extending between the drive shaft 26, gear assembly 18 and front plate 20 shows how the three components are assembled together and also represents the rotational axis of the gear assembly 18, about which the output driveshaft 32 rotates but the gear assembly 18 is also able to turn.

In this embodiment, the beam transducer 22 is provided by a discrete component which comprises a first end 40 fixed to with the front plate 20, and a second end 42 arranged to be coupled with the gear assembly 18, specifically with the beam receiving portion 30. The second end 42, of the beam transducer 22, is at least partially rounded to form a partial spherical shape. A connection PCB 44 is attached to the beam transducer 22 by a screw 46. The connection PCB 44 comprises a cable connector 48 to which cables are connected for connection to other control circuitry within the tool. The cable connector 48 may be a break free connector such that a cable connected thereto can easily be separated from the cable connector 48, with minimal force. This minimizes damage to the beam transducer in the event that the cable is pulled. The connection PCB 44 may also comprise an integrated temperature sensor arranged to output a temperature measurement signal. This temperature measurement may be used to account for temperature variations of the beam transducer 22 when determining a torque.

As is apparent in FIG. 3, the beam transducer 22 may extend axially between the front plate 20 and gear assembly 18 in parallel to the rotational axis of the gear assembly 18. Arranging the beam transducer 22 in this manner helps to ensure that the beam transducer 22 is caused to bend, rather than twist, when the gear assembly 18 turns relative to the front plate 20.

Figure 4:
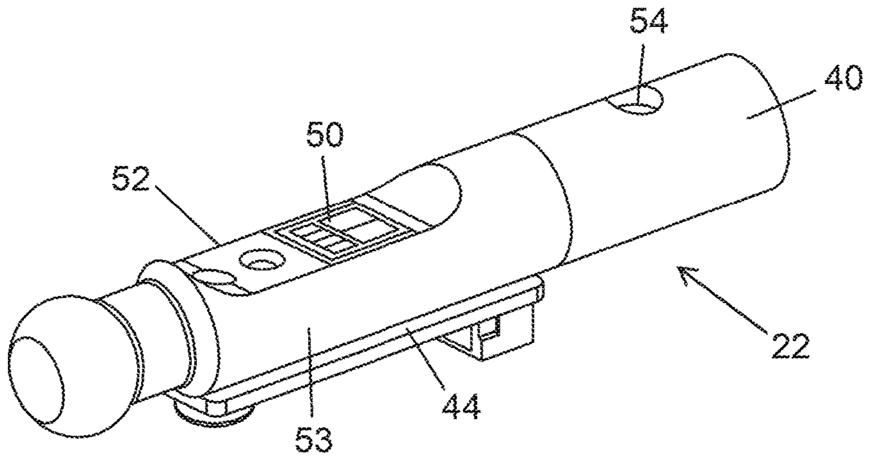
FIG. 4 shows a perspective view of the beam transducer.

FIG. 4 shows a perspective view of the beam transducer 22 in isolation, and shows the other side of the beam transducer 22 not seen in FIG. 3. As can be seen, on the other side of the beam transducer there is a strain gauge 50. The strain gauge 50 is mounted on a flat surface 52 of a narrowed portion 53 on the beam transducer 22 so as to be in good contact with the beam transducer 22. As previously discussed, the narrowed portion 53 may be dimensioned to ensure that the beam transducer 22 bends for a desired range of torque applications. The flat surface 52 also provides a convenient surface to mount the components of the bending measurement arrangement. The beam transducer 22 further comprises a mounting hole 54 arranged at the first end 40, for fixedly coupling the beam transducer to the first component, as described in more detail below with respect to FIG. 5.

Figure 5:
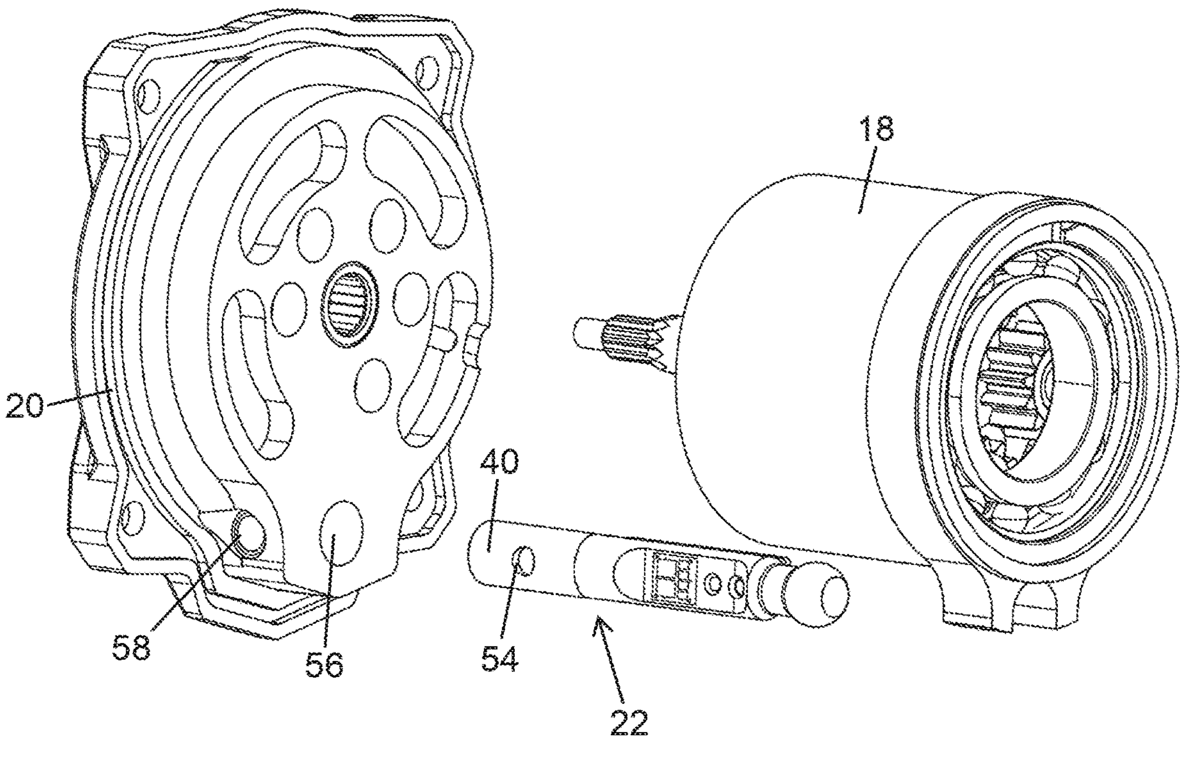
FIG. 5 shows an exploded view of the gear assembly, front plate and beam transducer.

FIG. 5 shows an exploded view of the gear assembly 18, front plate 20 and beam transducer 22 when viewed from the rear of the gear assembly 18. The front plate 20 comprises a support hole 56 shaped to receive the first end 40 of the beam transducer 22. The front plate 20 further comprise a fixing hole 58 extending radially into the aperture 56. As will be understood, when the first end 40 of the beam transducer 22 is fully inserted into the support hole 56, a fixing element, e.g. a screw or pin, may be inserted into the fixing hole 58, such that the fixing element extends through the fixing hole 58, into the support hole 58 and into the mounting hole 54 provided in the beam transducer 18. The fixing hole 58 and/or the mounting hole 54, whilst not shown, may be threaded such that when a fixing element, e.g. a screw, is inserted therein it is held in position. As will be appreciated, the insertion of a fixing element in the manner described above acts to fixedly couple the first end 40 of the beam transducer 22 to the front plate 20.

Figure 6:
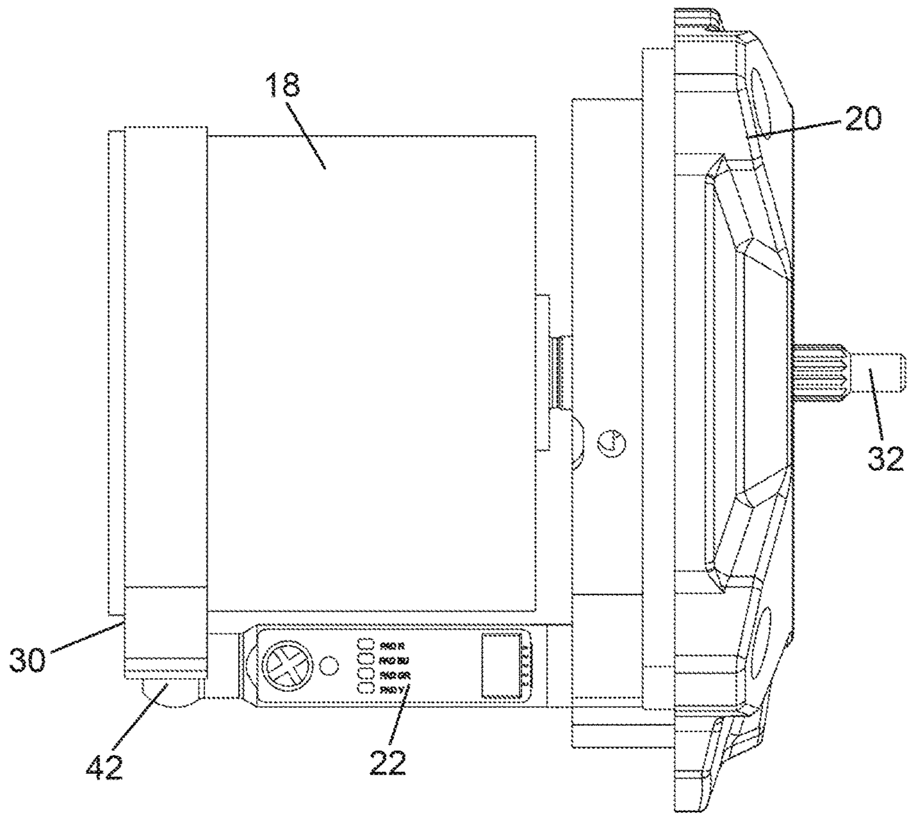
FIG. 6 shows a side view of the gear assembly, front plate and beam transducer assembled together.

FIG. 6 shows a side view of the gear assembly 18, front plate 20 and beam transducer 22 fully assembled together. As can be seen in this Figure, when fully assembled, the output driveshaft 32 on the gear assembly 18 extends through the front plate 20. In this fully assembled state, the first end 40 of the beam transducer 22 (not visible in this Figure) is fully inserted and secured into the support hole 56 (not visible in this Figure) on the front plate 20. Further, the second end 42 of the beam transducer 22 is coupled to the gear assembly 18 by being received in the beam receiving portion 30.

Figure 7:
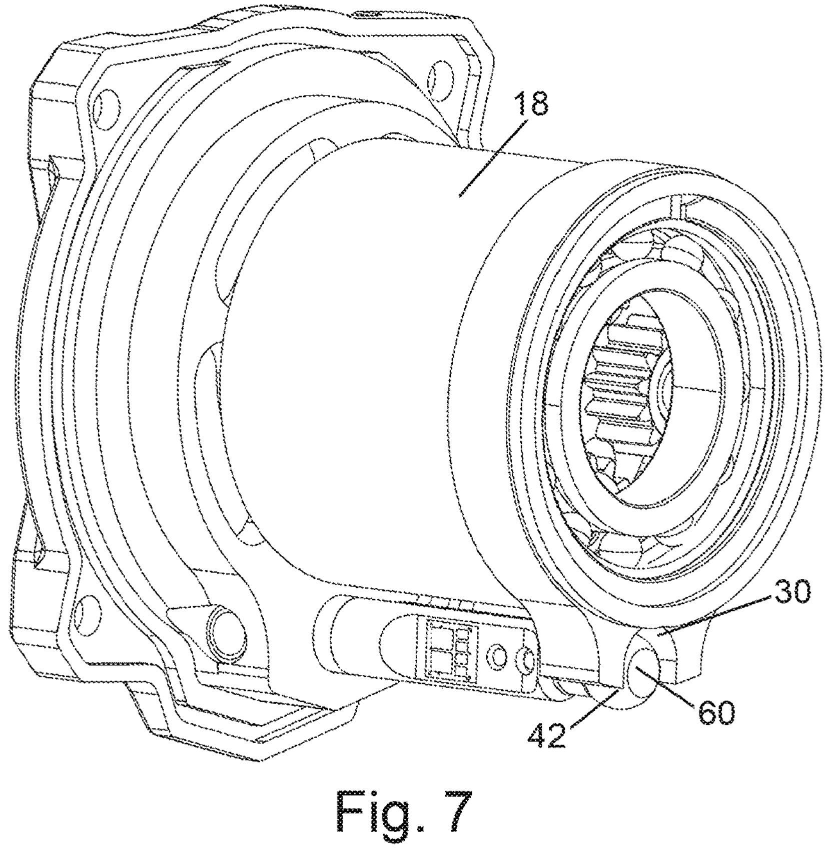
FIG. 7 shows a perspective view when viewed from the rear of the gear assembly, of the gear assembly, front plate and beam transducer assembled together.

FIG. 7 shows a perspective view of the assembled components seen in FIG. 6, when viewed from the rear end of the gear assembly 18. The second end 42 of the beam transducer 22 is received in the beam receiving portion 30. As can be seen in this Figure, whilst the second end 42 is mostly spherical, the second end 42 also comprises a flattened portion 60 at its end-most portion. As will be appreciated, the flattened portion 60 will not come into direct contact with the beam receiving portion 30. The second end 42 of the beam transducer 22 rests in the beam receiving portion 30, however it is not secured therein by any fixing means as is the case for the first end 40, as described above. Accordingly, the second end 42 of the beam transducer 22 may move, to a certain degree, within the beam receiving portion as will be described in more detail below.

Figure 8:
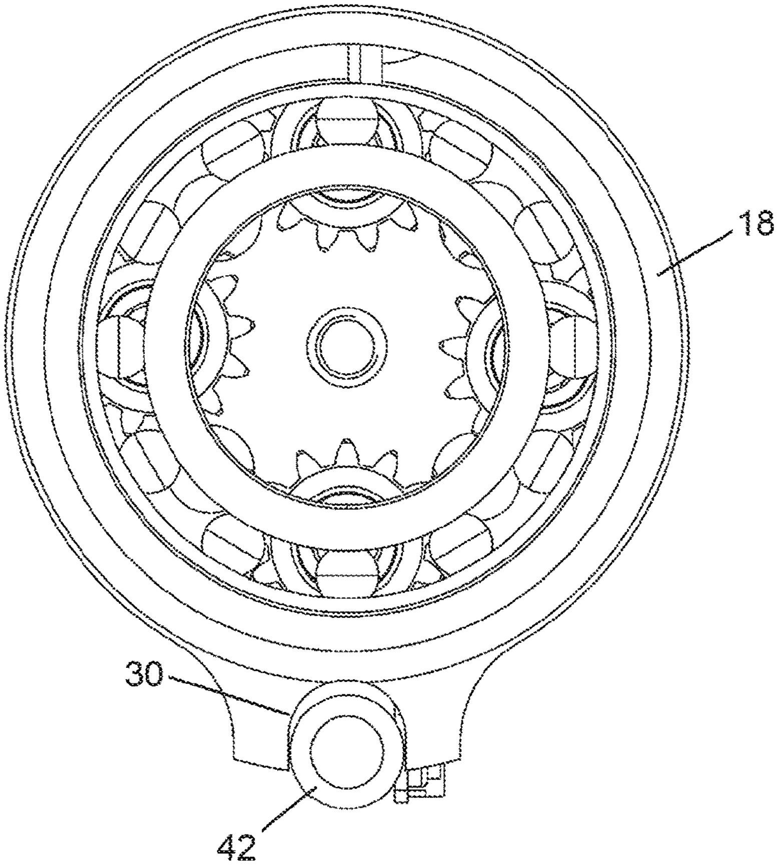
FIG. 8 shows a cross-sectional view through the gear assembly showing how the beam transducer is coupled to the gear assembly.
Figure 9:
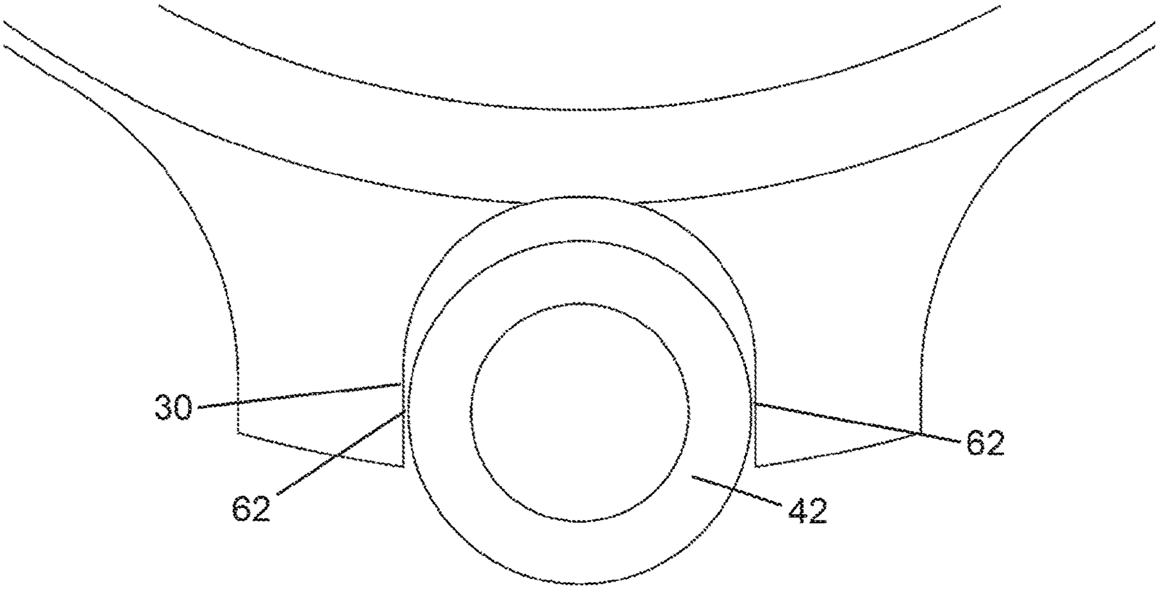
FIG. 9 shows a cross-sectional view focusing on the coupling between the beam transducer and the gear assembly.

FIG. 8 shows a cross-sectional view through the gear assembly 18, when viewed end-on. As can be seen in this Figure, the second end 42 of the beam transducer 22 is coupled to the gear assembly by being received in the beam receiving portion 30. The second end 42 has a circular cross section and the beam receiving portion 30 has a similarly shaped internal profile for receiving the second end 42. FIG. 9 shows a close-up of the cross-sectional view seen in FIG. 8, focusing on the beam receiving portion 30 with the second end 42 of the beam transducer 22 received therein. As is visible in this Figure, the beam receiving portion 30 has a minimum dimension that is slightly larger than the diameter of the second end 42 of the beam transducer 22. The purpose of this is to allow the second end 42 of the beam transducer 22 to be easily inserted into the beam receiving portion 30 during assembly. As discussed previously, ideally the beam receiving portion 30 is as small as possible whilst still permitting insertion of the second end 42. As a result, when the second end 42 is received centrally within the beam receiving portion 30, there may be a small spacing 62 between the second end 42 and the beam receiving portion 30 on either side. As will be appreciated, when the motor drive shaft 26 is first caused to rotate, thereby driving the gear assembly 18 to cause rotation of the output driveshaft 32, as the gear assembly 18 is not fixed to the housing 2, the gear assembly 18 may tend to turn a small amount. The Applicant has recognized that providing a spacing 62 which is as small as possible helps to avoid the second end 42 of the beam transducer 22 from accelerating and impacting the beam receiving portion 30 when the torque tool is started up. This may help to minimize any erroneous torque outputs during startup of the tool.

Figure 10:
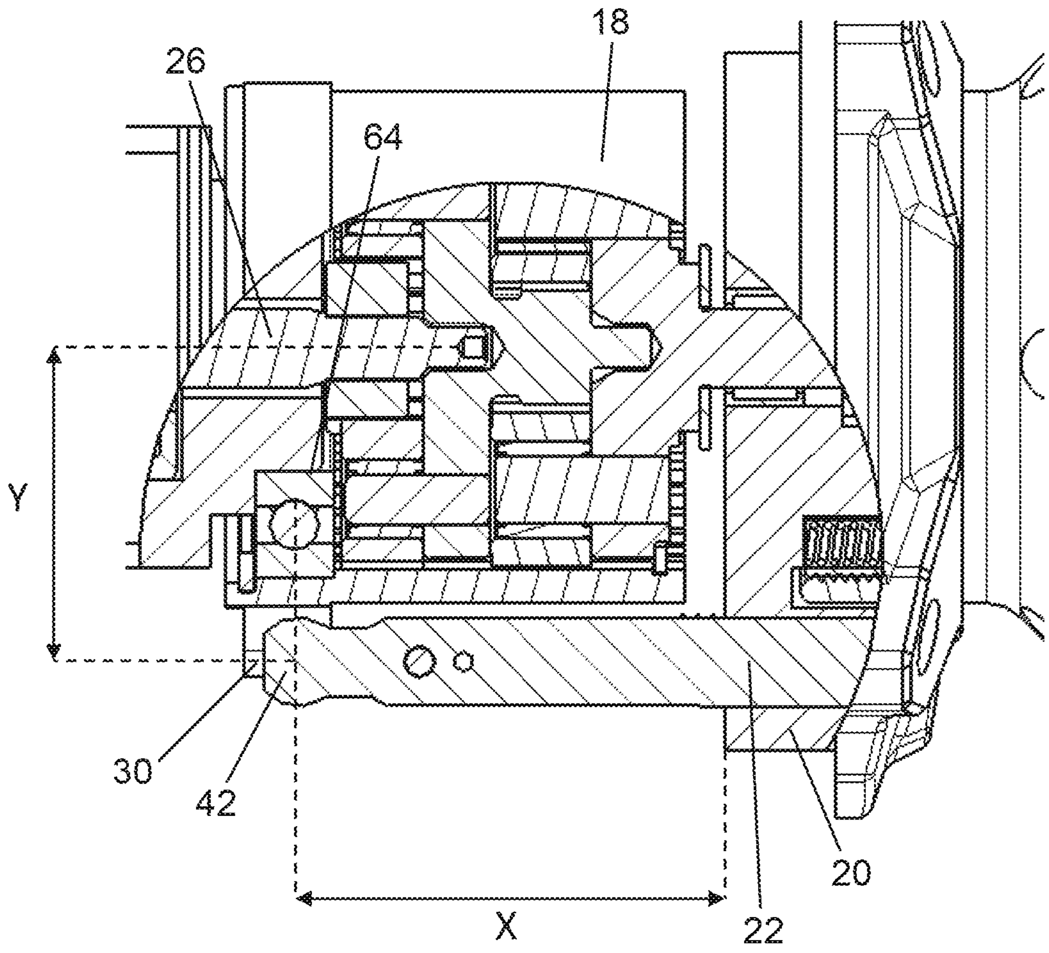
FIG. 10 shows a partial cross-sectional view through the gear assembly and illustrates the coupling between the beam transducer and the gear assembly.

FIG. 10 shows a partial cross-sectional view through the torque tool seen in FIG. 1 illustrating the interaction between the beam transducer 22 and beam receiving portion 30 relative to other parts of the gear assembly 18. The gear assembly 18 comprises internal bearings 64, one of which can be seen in this Figure. Distance Y represents the distance between the centre of the drive shaft 26, i.e. the axis about which the gear assembly 18 turns, and the centre of the second end 42 of the beam transducer 22. The Applicant has found that the gear assembly 18 may tilt or pivot a small amount within the torque tool during use which can alter the distance Y. The Applicant has recognized that it is beneficial for Y to vary as little as possible to ensure accurate torque measurements. The Applicant has found that alignment of the second end 42 of the beam transducer 22 with the bearings 64 within the gear assembly 18 may help to minimize variation of Y during use. Any variation in Y during use is also kept to a minimum by having a beam receiving portion 30 which has dimensions as close as possible to the dimensions of the second end 42, whilst at the same time allowing the second end 42 to be inserted into the beam receiving portion 30 during assembly.

Further, in order to ensure accurate torque measurements, as discussed previously, it is advantageous for the point about which the beam transducer 22 is bent to remain constant. This effectively means that the beam transducer 22 has a constant lever length. Distance X represents the distance from the front plate 20 to the point of contact between the second end 22 of the beam transducer 22 and the beam receiving portion 30, i.e. the length of the beam transducer 22 which is bent.

Due to inherent manufacturing tolerances, it is difficult to manufacture a tool in which the gear assembly 18 does not move laterally. As a result, during use of the tool, the gear assembly 18, and hence the beam receiving portion which is provided therewith, may move laterally within the torque tool. It is beneficial therefore to be able to account for this. In the embodiment shown, this is achieved by the provision of the rounded second end 42 which is moveably received in the beam receiving portion 30. Due to the fact that the second end 42 is moveably received in the beam receiving portion 30, and the second end 42 being rounded, the point of contact between the second end 42 will move along the beam receiving portion 30, but ultimately the force applied from the beam receiving portion to the second end 42 will be on the tip of the rounded end and thus the distance X will remain constant. Maintaining X constant, or at least as close to constant as possible, may improve the accuracy of the torque measurements.

Operation of the torque tool will now be described with reference to FIGS. 1-10. When a user wishes to apply torque to a workpiece, e.g. a nut or bolt, to a specific amount of torque, the user may select the torque tool as seen and attach, for example, a suitable socket to the drive output 14. Once the socket has been engaged with a workpiece, a user may operate the trigger 8 in order to activate the motor 16 to ultimately apply torque to the workpiece. When activated, the motor 16 will cause the motor drive shaft 26 to rotate. With the drive shaft 26 operatively coupled to the gear assembly 18, rotation of the drive shaft 26 will cause rotation of the output drive shaft 32. The output driveshaft 32 then drives rotation of the drive output 14 and thus rotate the workpiece to which it is engaged, e.g., via a socket.

As torque is applied to the workpiece, the drive output 14 will experience a reaction force resulting from the torque being applied to turn it which acts to resist further rotation of the workpiece. This reaction force will be transmitted from the drive output 14, back through the output gearbox 12, through the output driveshaft 32 and into the gear assembly 18. This reaction force will tend to cause the gear assembly 18 to turn about its axis. As will be appreciated, as the gear assembly 18 turns, the beam receiving portion 30, as part of the gear assembly 18, will also rotate around the gear assembly's rotational axis. As the beam receiving portion 30 rotates, the beam receiving portion 30 will apply a lateral force to the second end 42 of the beam transducer 22 received therein. As the first end 40 of the beam transducer is fixedly coupled to the front plate 20, which is fixedly mounted with respect to the housing 2, the first end 40 cannot move and thus the application of the lateral force to the second end 42 will cause the beam transducer 22 to bend.

With the second end 42 of the beam transducer 22 moveably received in the beam receiving portion 30, and due to the spherical shape of the second end 42, as the gear assembly 18 turns, the second end 42 will be free to move within the beam receiving portion 30 and any lateral movement or tilting of the gear assembly 18 will be accounted for. This helps to ensure that the bending measured by the beam transducer, and the torque determined therefrom, accurately reflects the amount of torque applied by the tool.

The bending of the beam transducer 22 is measured by the strain gauge 50 which is connected to the PCB 44. The PCB 44 may be operatively connected to a control, and provide said control with the output from the strain gauge 50. The control may then determine from the strain gauge the torque experienced by the tool. The torque determined by the control may be output to, for example a display. Alternatively, and/or in addition, when the torque reaches a threshold torque, the control may turn off the motor 16, in order to avoid applying too much torque to a workpiece. Such a threshold torque may be preset for a particular workpiece or tool, or alternatively it may be selectable by a user via a user input, for example prior to commencing a tightening operation. The control may also have preprogrammed operational modes, for example an audit mode in which the tool is used to apply torque to already-tightened workpieces. Such a mode may, for example, reduce the operational speed of the motor 16 or gear assembly 18 in order to avoid overtightening of the workpiece. Of course, the controller may have a number of preprogrammed operational modes which can be selected by a user, e.g. via a user input. Other operational modes may include an 'angle mode' in which the torque tool is configured to tighten a workpiece to a specific torque and then further tighten the workpiece about a specific angle. Control over the angular rotation of the workpiece may be achieved by arranging a rotary encoder to measure rotation of a part of the torque tool, e.g. the output of the motor 16. As another example, another operational mode may include a 'breakout mode' in which the torque tool is used to provide an indication of the torque required in undoing a workpiece. This may be useful in order to assess the difference between the torque to which a workpiece is tightened and the torque which is required to undo the workpiece.

Where a control is provided, the control may comprise single or multiple processors. Additionally, the control may be configured to switch into a lower power consumption mode when not being used. Such a mode may, advantageously permit certain functions of the tool to remain active, and also allow the tool start-up time to be reduced. The tool may also be configured to detect if it is being used inappropriately, based on the torque measured, and for example output a warning to the user. As mentioned previously, the control may be capable of taking into account the temperature of the beam transducer 22 when determining the torque.

As will be appreciated, the tool may be operated to drive a workpiece in a clockwise or counter-clockwise direction. Due to the symmetry of the beam transducer 22 and the beam receiving portion 30, the tool will be suitable for providing an indication of the torque to which a workpiece is being tightened irrespective of the rotational direction.

When experiencing a torque, the gear assembly 18 will typically only turn by a relatively small amount, for example between 0-1° and so in operation the amount of bending of the beam transducer 22 will be relatively small.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

The invention claimed is:

1. A torque tool, for applying torque to a workpiece, comprising:

a drive shaft;

a first component having a rotatable output, and operatively connected to the drive shaft such that rotation of the drive shaft rotates the rotatable output;

a second component fixedly arranged relative to the first component;

a beam transducer extending lengthwise axially between the first and second components, and coupled to the first and second components, wherein a second end of the beam transducer is received in a beam receiving portion provided on one of the first or second components, so as to be moveably coupled to one of the first or second components, and wherein the second end of the beam transducer is at least partially rounded such that a point on the beam transducer at which a force is applied from the beam receiving portion of the first or second components remains substantially constant as the beam transducer moves within the beam receiving portion; and a bending measurement means or sub-system arranged to measure bending of the beam transducer;

wherein the first component is arranged such that a reaction force experienced by the rotatable output, in use, tends to turn the first component relative to the second component, the turning of which is resisted by the beam transducer thus causing bending of the beam transducer, and wherein the bending measurement means or sub-system is arranged to measure the bending of the beam transducer.

2. The torque tool as claimed in claim 1 wherein the beam transducer is arranged and coupled such that the first component laterally bends the beam transducer.

3. The torque tool as claimed in claim 1 wherein the bending measurement means or sub-system comprises at least one strain gauge.

4. The torque tool as claimed in claim 1 wherein a first end of the beam transducer is fixedly coupled to one of the first or second components.

5. The torque tool as claimed in claim 4 wherein the beam transducer is formed as an integral part of one of the first and second components.

6. The torque tool as claimed in claim 1 wherein the beam receiving portion comprises an aperture or slot in one of the first or second components, dimensioned to receive the second end of the beam transducer.

7. The torque tool as claimed in claim 6 wherein the aperture or slot is located in a peripheral region of the first or second components.

8. The torque tool as claimed in claim 1 wherein the rotatable output defines a rotational axis and the beam transducer extends lengthwise axially parallel to, and spaced from, the rotational axis.

9. The torque tool as claimed in claim 1 comprising a housing and the second component being fixedly mounted to the housing.

10. The torque tool as claimed in claim 1 wherein the first component comprises a gearbox.

11. The torque tool as claimed in claim 10 wherein the beam transducer is movably coupled to the gearbox, the gearbox incorporating a beam receiving portion in the form of an aperture or slot arranged on a peripheral outer portion thereof and wherein the gearbox is arranged to turn about a central axis extending therethrough and the beam receiving portion is radially displaced from the central axis.

12. The torque tool as claimed in claim 11 wherein the gearbox comprises a series of internal bearings which are arranged in the gearbox in alignment with the beam receiving portion, the second end being at least partially rounded and aligned with the internal bearings.

13. The torque tool as claimed in claim 1 further comprising a motor arranged to rotate the drive shaft.

14. The torque tool as claimed in claim 1 comprising at least one temperature sensor arranged to provide a temperature measurement within the tool operatively connected to a controller, wherein the controller is configured to account for the temperature measurement when determining a measured amount of torque applied by the tool.

15. The torque tool as claimed in claim 14 wherein the temperature sensor is arranged on the beam transducer in order to provide a temperate measurement of the beam transducer itself.

16. The torque tool as claimed in claim 1 wherein the beam transducer comprises a narrowed portion on which the bending measurement means or sub-system is arranged.

17. The torque tool as claimed in claim 1 wherein the beam transducer and/or the bending measurement means or sub-system is arranged on a portion of the torque tool which is spaced from any surface thereof which may contact a planar surface if the tool is dropped.

18. The torque tool as claimed in claim 1 comprising a housing comprising an upper portion connected to a handle portion, wherein the drive shaft, first component, second component, beam transducer and bending measurement means or sub-system are arranged in the upper portion and further wherein the beam transducer is arranged in a lower part of the upper portion proximal to the handle portion.

* * * * *